United States Patent
Wang

(10) Patent No.: US 9,612,483 B2
(45) Date of Patent: Apr. 4, 2017

(54) DISPLAY PANEL, DISPLAY DEVICE AND MANUFACTURING METHOD OF THE DISPLAY PANEL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Yan Wang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 0 days.

(21) Appl. No.: 14/895,691

(22) PCT Filed: May 14, 2015

(86) PCT No.: PCT/CN2015/078919
§ 371 (c)(1),
(2) Date: Dec. 3, 2015

(87) PCT Pub. No.: WO2016/119335
PCT Pub. Date: Aug. 4, 2016

(65) Prior Publication Data
US 2016/0223848 A1    Aug. 4, 2016

(30) Foreign Application Priority Data
Jan. 30, 2015   (CN) .......................... 2015 1 0050442

(51) Int. Cl.
G02F 1/1339     (2006.01)
G02F 1/1368     (2006.01)
(Continued)

(52) U.S. Cl.
CPC ........ *G02F 1/13394* (2013.01); *G02F 1/1339* (2013.01); *G02F 1/1341* (2013.01);
(Continued)

(58) Field of Classification Search
CPC .. G02F 1/1339; G02F 1/1341; G02F 1/13394; G02F 1/1368; G02F 1/133345; G02F 2001/13415; G02F 2001/13398
(Continued)

(56) References Cited

U.S. PATENT DOCUMENTS

2007/0040964 A1* 2/2007 Shohara ............ G02F 1/133345
                                                        349/106
2009/0207370 A1   8/2009 Tsuchiya et al.

FOREIGN PATENT DOCUMENTS

CN         101149545 A      3/2008
CN         101349850 A      1/2009
(Continued)

OTHER PUBLICATIONS

International Search Report & Written Opinion Appln. No. PCT/CN2015/078919; Dated Oct. 12, 2015.
(Continued)

*Primary Examiner* — Nathanael R Briggs
*Assistant Examiner* — William Peterson
(74) *Attorney, Agent, or Firm* — Ladas & Parry LLP

(57) ABSTRACT

A display panel, a display device and a manufacturing method of the display panel are disclosed. The display panel includes: an array substrate and a counter substrate disposed in opposition to each other, and a sealant adhered between the array substrate and the counter substrate; in a peripheral region of the array substrate positioned in opposition to the sealant, there are provided a plurality of thin film transistors, a surface of each of the thin film transistors is covered with a block-like insulating film, and there is depressed region
(Continued)

between adjacent block-like insulating films; at the location of the counter substrate corresponding to the depressed region, there is provided a protruding structure. By adopting the scheme, adhesive areas between the sealant and the array substrate and the counter substrate each are greatly increased. Therefore, the adhesion force of the sealant is effectively raised, and the product quality of the display device is promoted.

18 Claims, 1 Drawing Sheet

(51) Int. Cl.
    *G02F 1/1333*      (2006.01)
    *G02F 1/1341*      (2006.01)

(52) U.S. Cl.
    CPC ...... *G02F 1/1368* (2013.01); *G02F 1/133345* (2013.01); *G02F 2001/13398* (2013.01); *G02F 2001/13415* (2013.01)

(58) Field of Classification Search
    USPC .......................................................... 349/153
    See application file for complete search history.

(56) References Cited

FOREIGN PATENT DOCUMENTS

| | | |
|---|---|---|
| CN | 101706630 A | 5/2010 |
| CN | 101713895 A | 5/2010 |
| CN | 201788338 A | 4/2011 |
| CN | 102854665 A | 1/2013 |
| CN | 102866542 A | 1/2013 |
| CN | 103943632 A | 7/2014 |
| CN | 104536211 A | 4/2015 |

OTHER PUBLICATIONS

First Chinese Office Action dated Dec. 22, 2016, Appln. No. 201510050442.1.

\* cited by examiner

DISPLAY PANEL, DISPLAY DEVICE AND MANUFACTURING METHOD OF THE DISPLAY PANEL

TECHNICAL FIELD

Embodiments of the present invention relate to a display panel, a display device and a manufacturing method of the display panel.

BACKGROUND

Among flat panel display devices, thin film transistor liquid crystal displays (TFT-LCDs) have the advantages such as small volume, low power consumption, relatively low manufacturing cost, irradiation-free, etc., and thus obtain a leading role in the current market for flat panel displays.

A display panel is one of the main components of a TFT-LCD, and its structure usually includes an array substrate and a color filter substrate disposed in opposition to each other, a sealant adhered between the array substrate and the color filter substrate, and liquid crystals filled within a cell-like structure formed by the array substrate, the color filter substrate and the sealant. In the peripheral area of the array substrate, the TFTs of gate-line driving circuits are covered with an insulating film, and the insulating film can serve for providing insulation protection for the TFTs, thereby reducing the influence of the external environment on operating characteristics of the TFTs.

SUMMARY

According to embodiments of the present invention, there are provided a display panel, a display device and a manufacturing method of the display panel, so as to raise the adhesion force of a sealant and promote the product quality of the display device.

According to at least one embodiment of the invention, there is provided a display panel, which includes: an array substrate and a counter substrate disposed in opposition to each other, a sealant adhered between the array substrate and the counter substrate, and liquid crystals filled between a cell-like structure formed by the array substrate, the color filter substrate and the sealant; in a peripheral region of the array substrate positioned in opposition to the sealant, there are provided a plurality of thin film transistors, a surface of each of the thin film transistors is covered with a block-like insulating film, and there are depressed regions between adjacent block-like insulating films; at a location of the counter substrate corresponding to at least one of the depressed regions, there is provided a protruding structure.

According to at least one embodiment of the invention, there is further provided a display device, comprising the above display panel.

According to at least one embodiment of the invention, there is further provided a manufacturing method of a display panel, comprising: a step of manufacturing an array substrate, a step of manufacturing a counter substrate and a step of manufacturing a liquid crystal cell. The step of manufacturing the array substrate includes forming a block-like insulating film over each of thin film transistors in a peripheral region of the array substrate, so that the block-like insulating film covers a corresponding thin film transistor, and depressed regions are provided between adjacent block-like insulating films; the step of manufacturing the counter substrate includes forming a protruding structure at a location of a peripheral region of the counter substrate in correspondence with at least one of the depressed regions.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

REFERENCE NUMERALS

11—an array substrate; 12—a counter substrate; 13—a sealant; 14—a thin film transistor; 15—a block-like insulating film; 16—a depressed region; 17—a protruding structure; 18—spherical supports

DETAILED DESCRIPTION

In order to make objects, technical details and advantages of the embodiments of the invention apparent, hereinafter, the technical solutions of the embodiments of the invention will be described in a clearly and fully understandable way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which should be within the scope sought for protection by the invention.

In the research, it has been noticed by inventor(s) of the present application that, an insulating film on TFTs of gate driving circuits has a thicker thickness, and a less denseness, and therefore the adhesion of a sealant to the insulating film is relatively poor. In a high-temperature and high-humidity environment, water vapor become very prone to enter a liquid crystal cell via a gap caused by peeling between the sealant and the insulating film, and thus affects the product quality of the display device (for example, water vapor's penetration into the liquid crystal cell can result in inhomogeneity in the brightness of displayed pictures of the display device).

In order to raise the adhesion force of a sealant and promote the product quality of a display device, a display panel, a display device and a manufacturing method of the display panel are provided by embodiments of the invention. The present invention will be described in detail further more with reference to embodiments.

Figure 1:
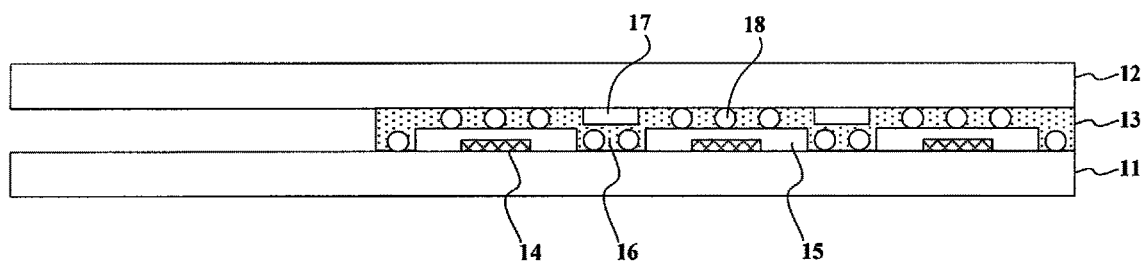
FIG. 1 is a structurally schematic sectional view illustrating a peripheral area of a display panel according to an embodiment of the invention.

As illustrated in FIG. 1, a display panel provided by at least one embodiment of the invention includes an array substrate 11 and a counter substrate 12 disposed in opposition to each other, and a sealant 13 adhered between the array substrate 11 and the counter substrate 12, as well as liquid crystals (not illustrated in the drawing) filled within a cell-like structure formed by the array substrate 11, the color filter substrate 12 and the sealant 13. In a peripheral area of the array substrate 11 positioned in opposition to the sealant 13, there are provided a plurality of thin film transistors 14, a surface of each of the thin film transistors 14 is covered with a block-like insulating film 15, and a depressed region 16 is provided between adjacent block-like insulating films 15. At the location of the counter substrate 12 in correspondence with at least one depressed region 16, there is provided a protruding structure (e.g., a protruding spacer 17).

In embodiments of the invention, there is no limit on the specific types of the display panels. For example, the display panel may be a display panel of a TN (Twisted Nematic) mode, a display panel of a VA (Vertical Alignment) mode, a display panel of an IPS (In-Plane-Switching) or ADS (Advanced Super Dimension Switch) mode, or the like.

It is to be noted that, the counter substrate 12 may be a color filter substrate or a transparent substrate. In addition, drawings of embodiments of the invention are illustrated with reference to an example in which each block-like insulating film 15 covers one thin film transistor 14, while each block-like insulating film 15 can also cover at least two thin film transistors 14.

In at least one embodiment, the counter substrate 12 may include a spacer layer and a planarization layer, and a protruding structure may be made of the material for forming the spacer layer or the planarization layer on the counter substrate 12. In a display panel provided by the following embodiment of the invention, description will be given to an example in which the protruding structure is a protruding spacer 17.

In the peripheral area of the array substrate 11, a gate-line driving circuit is usually required in design, and in at least one embodiment of the invention, a surface of each thin film transistor 14 of the gate-line driving circuit may be covered with a block-like insulating film 15.

For example, the block-like insulating film 15 may be formed of not only an organic substance (e.g., resin) but also an inorganic substance (e.g., silicon nitride) may also be used. The block-like insulating film 15 can serve for protection of the thin film transistor 14, thereby reducing the influence of the external environment on operating characteristics of the thin film transistor 14.

For example, the block-like insulating film 15 and an insulating film of the same substance within a display region of the array substrate 11 may be produced in the same layer. The thickness of the insulating film is usually a few microns, and is larger than the thickness of other film layer of the array substrate, and therefore, after the insulating film is coated on the substrate, the height difference between a thin film transistor and an opening region of a pixel can be decreased. Thus, this makes the array substrate be more planarized.

In at least one embodiment, as illustrated in FIG. 1, the sealant 13 may include a base material and spherical supports 18 distributed within the base material. For example, the spherical supports 18 may be silicon balls, and evenly distributed within the base material. Addition of the spherical supports 18 into the base material can provide a supporting function, so that it is easy to take control of the size of the cell gap (thickness) of the liquid crystal cell. For example, the sealant 13 may be coated in the peripheral region of an array substrate 11, and then the array substrate is aligned, in vacuum, with a counter substrate 12 on which liquid crystals have been dropped, so as to form a liquid crystal cell; the sealant 13 may also be coated in the peripheral region of a counter substrate 12, and then the counter substrate is aligned, in vacuum, with an array substrate 11 on which liquid crystals have been dropped, so as to form a liquid crystal cell.

Figure 2:
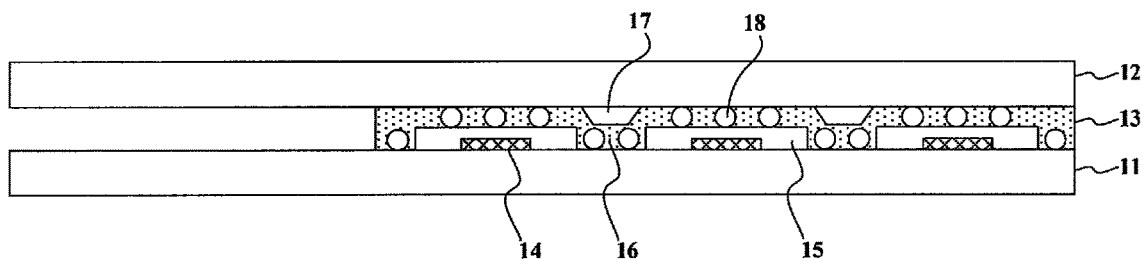
FIG. 2 is a structurally schematic sectional view illustrating a peripheral area of a display panel according to another embodiment of the invention.

There is no limit on the specific shapes of the protruding spacers 17. For example, as illustrated in FIG. 1, in the embodiment, the protruding spacers 17 are columnar protruding spacers. For example, as illustrated in FIG. 2, in the embodiment, the protruding spacers 17 are frustum-shaped protruding spacers. Further, for example, the protruding spacers may also be tapered protruding spacers. In at least one embodiment, a height of a protruding spacer 17 is equal to the depressed depth of a depressed region 16. In this way, the filling thickness of the sealant 13 between the array substrate 11 and the counter substrate 12 may be made to be relatively uniform.

In at least one embodiment, for the counter substrate 12, a protruding spacer 17 may be provided at the location corresponding to each depressed region 16. As such, the adhesive area of the sealant can be further increased, thereby promoting the adhesive effect furthermore.

In the technical solutions of embodiments of the invention, at the locations of a counter substrate 12 corresponding to at least part of depressed regions 16, there are provided protruding spacers 17 that protrudes toward the depressed regions 16, and when the counter substrate 12 and an array substrate 11 is cell-assembled, an extrusion force toward the depressed regions 16 may be exerted on sealant 13 via the protruding spacers 17, so that the sealant 13 is fully filled within the depressed regions 16 and reliably adhered to a surface of the depressed regions 16. Furthermore, due to the extruding action of the protruding spacers 17, the thickness of the sealant tends to be uniform, and in this way, the cell thickness of the liquid crystal cell in the peripheral region can be made to be relatively uniform. With this configuration, the adhesion areas between the sealant 13 and the array substrate 11 and the counter substrate 12 each are greatly increased, and therefore, the adhesion force of the sealant 13 is effectively raised. Whether in a normal environment, or in a high-temperature and high-humidity environment, tightness of the sealant 13 become better, and water vapor cannot easily enter the liquid crystal cell, thereby promoting the product quality of the display device.

A display device provided by an embodiment of the invention includes the display panel provided by any of the aforementioned embodiments. In the display device, the adhesion force of a sealant of a display panel become better, and water vapor cannot easily get into a liquid crystal cell. Thus, the product quality of the display device is relatively high. There is no limit on the specific type of the display device, and for example, it may be a liquid crystal display, a liquid crystal television, an electronic paper or other display device.

According to at least one embodiment of the invention, there is further provided a manufacturing method of a display panel, which includes a step of manufacturing an array substrate, a step of manufacturing a counter substrate, and a step of manufacturing a liquid crystal cell. Hereinafter, the step of manufacturing the array substrate and the step of manufacturing the counter substrate will be described in detail, respectively.

The step of manufacturing the array substrate include forming a block-like insulating film over each thin film transistor in a peripheral region of the array substrate, so that the block-like insulating film covers a corresponding thin film transistor, and there is a depressed region between adjacent block-like insulating films.

In at least one embodiment, the step of manufacturing the array substrate may further include forming an insulating film in a display region of the array substrate. The insulating film, for example, is formed of the same substance as the block-like insulating film and is produced in the same layer as the block-like insulating film, namely, the block-like insulating film situated in the peripheral region and the insulating film situated in the display region are formed by the same patterning process.

The step of forming the counter substrate includes forming a protruding structure (e.g., a protruding spacer) at the location of the peripheral region of the counter substrate in correspondence with at least depressed region. Namely, protruding structures are formed at the location of the peripheral region of the counter substrate in correspondence with at least part of depressed regions.

In at least one embodiment, the step of manufacturing the counter substrate may further include forming a supporting spacer or a planarization layer in a display region of the counter substrate, in which the supporting spacer or the planarization layer is of a same substance and is produced in the same layer as the protruding structure. Namely, the protruding structure situated in the peripheral region and the supporting spacer or the planarization layer situated in the display region are formed by the same patterning process.

With respect to the display panel made by using the above method, water vapor cannot easily enter the liquid crystal cell, and when the display panel is applied to a display device, the product quality of the display device can be greatly improved.

In order to further increase the adhesive area of the sealant, it is possible that when a counter substrate is produced, a protruding structure (e.g., a protruding spacer) is formed at the location of the counter substrate in correspondence with each of depressed regions.

Regarding the method provided by at least one embodiment of the invention, the step of manufacturing the liquid crystal cell may include dropping liquid crystals on an array substrate, and coating a sealant in a peripheral region of a counter substrate; and aligning the array substrate and the counter substrate so as to form the liquid crystal cell.

In the method provided by at least another embodiment of the invention, steps of manufacturing the liquid crystal cell may include dropping liquid crystals on a counter substrate, and coating a sealant in a peripheral region of an array substrate; and aligning the array substrate and the counter substrate, so as to form the liquid crystal cell.

With the method provided by the above embodiments, when a counter substrate and an array substrate are aligned, an extrusion forced toward a depressed region can be exerted on a sealant via a protruding structure that protrudes toward the depressed region, so that the sealant is fully filled within the depressed region, and reliably adhered to a surface of the depressed region. Furthermore, due to the extruding action of the protruding structure, the thickness of the sealant tends to become uniform, so that the cell gap of the liquid crystal cell in the peripheral region is relatively uniform. With the method provided by embodiments of the invention, adhesive areas between the sealant and the array substrate and the counter substrate each are greatly increased, and therefore, the adhesion force of the sealant is effectively raised. Whether in a normal environment or in a high-temperature and high-humidity environment, tightness of the sealant become better, and water vapor cannot easily enter the liquid crystal cell, thereby promoting the product quality of the display device.

Descriptions made above are merely exemplary embodiments of the invention, but are not used to limit the protection scope of the invention. The protection scope of the invention is determined by the attached claims.

This application claims the benefit of priority from Chinese patent application No. 201510050442.1, filed on Jan. 30, 2015, the disclosure of which is incorporated herein in its entirety by reference as a part of the present application.

What is claimed is:

1. A display panel, comprising: an array substrate and a counter substrate disposed in opposition to each other, a sealant adhered between the array substrate and the counter substrate, and liquid crystals filled between a cell-like structure formed by the array substrate, wherein,
    in a peripheral region of the array substrate positioned in opposition to the sealant, there are provided a plurality of thin film transistors, a surface of each of the thin film transistors is covered with a block-like insulating film, and there are depressed regions between adjacent block-like insulating films; at a location of the counter substrate corresponding to at least one of the depressed regions, there is provided a protruding structure; and
    wherein a height of the protruding structure is equal to a depressed depth of the depressed region.

2. The display panel claimed as claim 1, wherein the protruding structure includes a columnar protruding structure, a tapered protruding structure or a frustum-shaped protruding structure.

3. The display panel claimed as claim 1, wherein at the location of the counter substrate in correspondence with each of the depressed regions, there is provided a protruding structure.

4. The display panel claimed as claim 1, wherein the block-like insulating film includes a block-like insulating film formed of an organic substance or a block-like insulating film formed of an inorganic substance.

5. The display panel claimed as claim 1, wherein the sealant includes a base material and spherical supports distributed within the base material.

6. A display device, comprising the display panel claimed as claim 1.

7. A manufacturing method of a display panel, comprising a step of manufacturing an array substrate, a step of manufacturing a counter substrate and a step of manufacturing a liquid crystal cell, wherein,
    the step of manufacturing the array substrate includes forming a block-like insulating film over each of thin film transistors in a peripheral region of the array substrate, so that the block-like insulating film covers a corresponding thin film transistor, and depressed regions are provided between adjacent block-like insulating films;
    the step of manufacturing the counter substrate includes forming a protruding structure at a location of a peripheral region of the counter substrate in correspondence with at least one of the depressed regions; and
    wherein a height of the protruding structure is formed equal to a depressed depth of the depressed region.

8. The manufacturing method claimed as claim 7, wherein the step of manufacturing the liquid crystal cell includes:
    dropping liquid crystals on the array substrate, and coating a sealant in the peripheral region of the counter substrate; and
    aligning the array substrate and the counter substrate so as to form the liquid crystal cell.

9. The manufacturing method claimed as claim 7, wherein the step of manufacturing the liquid crystal cell includes:
    dropping liquid crystals on the counter substrate, and coating a sealant in the peripheral region of the array substrate; and
    aligning the array substrate and the counter substrate so as to form the liquid crystal cell.

10. The manufacturing method claimed as claim 7, wherein the protruding structure is formed at the location of the peripheral region of the counter substrate in correspondence with each of the depressed regions.

11. The manufacturing method claimed as claim 7, wherein,
the step of manufacturing the array substrate further includes: forming an insulating film on a display region of the array substrate, so that the insulating film is formed of a same substance and produced in a same layer as the block-like insulating film.

12. The manufacturing method claimed as claim 7, wherein the step of manufacturing the counter substrate further includes: forming a supporting spacer or a planarization layer in a display region of the counter substrate, so that the supporting spacer or the planarization layer is formed of a same substance and produced in a same layer as the protruding structure.

13. The display panel claimed as claim 2, wherein at the location of the counter substrate in correspondence with each of the depressed regions, there is provided a protruding structure.

14. The display panel claimed as claim 2, wherein the block-like insulating film includes a block-like insulating film formed of an organic substance or a block-like insulating film formed of an inorganic substance.

15. The display panel claimed as claim 2, wherein the sealant includes a base material and spherical supports distributed within the base material.

16. The display panel claimed as claim 1, wherein at the location of the counter substrate in correspondence with each of the depressed regions, there is provided a protruding structure.

17. The display panel claimed as claim 1, wherein the block-like insulating film includes a block-like insulating film formed of an organic substance or a block-like insulating film formed of an inorganic substance.

18. The display panel claimed as claim 1, wherein the sealant includes a base material and spherical supports distributed within the base material.

* * * * *